(12) United States Patent
He

(10) Patent No.: US 7,856,025 B2
(45) Date of Patent: Dec. 21, 2010

(54) METHOD AND SYSTEM FOR INTERCOMMUNICATING BETWEEN PRIVATE NETWORK USER AND NETWORK WITH QOS GUARANTEE

(75) Inventor: Yungu He, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 11/780,612

(22) Filed: Jul. 20, 2007

(65) Prior Publication Data

US 2007/0263633 A1 Nov. 15, 2007

Related U.S. Application Data

(63) Continuation of application No. PCT/CN2006/000723, filed on Apr. 19, 2006.

(30) Foreign Application Priority Data

Apr. 25, 2005 (CN) .................... 2005 1 0066237

(51) Int. Cl.
*H04L 12/28* (2006.01)
*H04L 12/56* (2006.01)
(52) U.S. Cl. ..................... 370/408; 370/396
(58) Field of Classification Search ................. 370/229, 370/395, 408; 709/204
See application file for complete search history.

(56) References Cited

U.S. PATENT DOCUMENTS

2002/0036983 A1* 3/2002 Widegren et al. ........ 370/230.1
2002/0085490 A1* 7/2002 O'Neil ........................ 370/229
2002/0101859 A1* 8/2002 Maclean ..................... 370/352
2003/0206536 A1 11/2003 Maggenti
2004/0028035 A1* 2/2004 Read .......................... 370/352
2004/0215817 A1 10/2004 Qing et al.
2007/0076702 A1* 4/2007 Yang .......................... 370/389

FOREIGN PATENT DOCUMENTS

CN 1411220 4/2003

(Continued)

OTHER PUBLICATIONS

IETF, Network Working Group SIP: Session Initiation Protocol RFC 3261, Rosenberg et al. Jun. 2002, The Internet Society.*

(Continued)

*Primary Examiner*—Daniel Wu
*Assistant Examiner*—Frederick Ott
(74) *Attorney, Agent, or Firm*—Finnegan, Henderson, Farabow, Garrett & Dunner LLP

(57) ABSTRACT

A method and a system for intercommunicating between a private network user and a network with QoS guarantee are provided. The bearer control layer entity and the application layer entity obtain the address (port) translation information in the network with independent bearer control layer, and then allocate the resources for the private network user based on the address (port) translation information. According to the present invention, the various function entities may process transmission and translation of the private addresses correctly and hence accomplish a correct addressing and resource allocation. Thus, the problems that the end-to-end QoS resource allocation cannot be accomplished and the end-to-end QoS cannot be guaranteed when the user uses a private address are solved.

7 Claims, 2 Drawing Sheets

FOREIGN PATENT DOCUMENTS

| | | | |
|---|---|---|---|
| CN | 1411220 | A | 4/2003 |
| CN | 1516409 | A | 7/2004 |
| CN | 1523834 | A | 8/2004 |
| CN | 1170393 | C | 10/2004 |
| CN | 1592300 | | 3/2005 |
| CN | 100450111 | C | 1/2009 |
| CN | 101146068 | B | 6/2010 |
| EP | 1032179 | | 8/2000 |
| EP | 1 667 378 | A1 | 6/2006 |
| WO | WO 03/094366 | A2 | 11/2003 |

OTHER PUBLICATIONS

"Telecommunications and Internet Converged Services and Protocols for Advanced Networking (TISPAN); IP Multimedia Subsystem (IMS);Stage 2 TISPAN NGN Release 1 TS.23.228 Release 6 modified; Draft ETSI TS 2XXXXX" ETSI Standards, LIS, Sophia Antipolis Cedex , France, No. V 0.0.3, Jan. 1, 2005, XP014028797.

European Search Report dated Aug. 27, 2008; Application No./Patent No. 06722372.7-1249 / 1879335 PCT/CN2006000723.

First Chinese Office Action dated (mailed) May 25, 2007, issued in related Chinese Application No. 2005100662370, Huawei Technologies Co., Ltd.

Second Chinese Office Action dated (mailed) Jul. 6, 2007, issued in Chinese Application No. 2005100662370, Huawei Technologies Co., Ltd.

Third Chinese Office Action dated (mailed) Jan. 4, 2008, issued in Chinese Application No. 2005100662370, Huawei Technologies Co., Ltd.

First Chinese Office Action dated (mailed) May 8, 2009, issued in Chinese Application No. 2007101814971, Huawei Technologies Co., Ltd.

Written Opinion of the International Searching Authority (translation) dated (mailed) Aug. 10, 2006, Application No. PCT/CN2006/000723, Huawei Technologies Co., Ltd.

\* cited by examiner

METHOD AND SYSTEM FOR INTERCOMMUNICATING BETWEEN PRIVATE NETWORK USER AND NETWORK WITH QOS GUARANTEE

The present application is a continuation of PCT application PCT/CN2006/000723, filed on Apr. 19, 2006, entitled "A METHOD FOR INTERCOMMUNICATION BETWEEN THE PRIVATE NETWORK USER AND THE QOS-ENSURED NETWORK AND A SYSTEM THEREFOR", which is incorporated by reference herein in its entirety.

FIELD OF THE INVENTION

The present invention relates to the field of network communication technology, and particularly to a method and a system for intercommunicating between a private network user and a network with QoS guarantee.

BACKGROUND OF THE INVENTION

With the continuous growth of the Internet scale, a great variety of network services and advanced multimedia systems emerged. Since real-time services are sensitive to network transmission delay and delay dithering, etc., they may be affected considerably when a bursty File Transport Protocol (FTP) service or a Hypertext Transport Protocol (HTTP) service involving image files appears on the network. Furthermore, multimedia services occupy a large bandwidth, and consequently, a reliable transmission for key services may be difficult to be ensured by the existing networks.

In view of the above, various Quality of Service (QoS) technologies have emerged as desired. The IETF (Internet Engineering Task Force) have recommended various service models and mechanisms to meet the demand of QoS. At present, it has been widely accepted by the industry that Integrated Service (Int-Serv) model may be used for the access and the edge of a network, and Differentiated Service (Diff-Serv) model may be used for the core of the network.

Since the Diff-Serv model only provides a measure for priority-guaranteed QoS, its actual effect may be unpredictable regardless of its high utilization of wire lines. For this reason, the industry has introduced an independent bearer control layer for differentiated services of a backbone network, and established a set of special Diff-Serv QoS signaling mechanisms. In order to propel applications of Diff-Serv, a QoS test network for the Diff-Serv model, i.e. a QBone test network, promoted by IETF together with some manufacturers and research institutes, has used a Bandwidth Broker model to realize a network resource and topology management, and some other manufacturers have proposed similar QoS server/resource manager technologies to manage topology resources and to coordinate QoS capabilities of respective Diff-Serv regions.

The above methods each establish a resource management layer for a Diff-Serv network to manage topology resources of the network. Since the traditional definition of Diff-Serv has some limitations, the above Diff-Serv model for the resource management may be referred to as a network model with an independent bearer control layer (or a centralized resource control layer) to avoid confusion.

In such a network model with an independent bearer control layer, as illustrated in FIG. 1, a bearer network control server including a Bandwidth Broker or a QoS server/resource manager may be configured with a management rule and network topology, and may allocate resource in response to a service bandwidth request from a user. Information, such as the service bandwidth request from the user, a result of the request, information of a path allocated for the service request by the bearer network resource manager and the like, may be transmitted via signaling among the bearer network control servers of each management domain.

When the bearer control layer handles the service bandwidth request from the user, the path for a user service may be determined, and the bearer network resource manager may notify an edge router to forward a service stream through the designated path.

As to how the bearer network implements forwarding the user service stream through a designated route in accordance with the path determined by the bearer control layer, a primary technology existing in the industry is the Multi-protocol Label Switching (MPLS) technology, which may establish a Label Switched Path (LSP) along the service stream path designated by the bearer control layer using a Resource Reservation, and may establish an end-to-end LSP using the Resource Reservation Protocol-Traffic Engineering (RSVP-TE) or an explicit routing mechanism of the Constraint-Routing Label Distribution Protocol (CR-LDP).

The above-mentioned solution may entirely guarantee the end-to-end QoS as required by services. However, how to guarantee the end-to-end QoS when the IP address of the user is a private address is not considered in the above-mentioned solution. Moreover, in practical, because the number of IPv4 address is limited, the dynamic address allocation method is used for allocating private addresses for the users in many networks.

In general, when a private network user interacts with an exterior user, the private network user will intercommunicate with the exterior user after the corresponding private address is translated to a public address though Network Address (Port) Translation function, and the Network Address (Port) Translation function is generally implemented in the gateway of the bearer layer, which makes the bearer control layer entity and the application layer entity unable to learn the address translation process. As a result, the addressing cannot be correctly implemented and accordingly the QoS resource allocation of the service cannot be accomplished.

Due to the above-mentioned reasons, the private user only allocated a private address unable to intercommunicate with the network with QoS guarantees to ensure the end-to-end QoS.

SUMMARY OF THE INVENTION

In view of the above-mentioned problems of the prior art, embodiments of the present invention provide a method and a system for intercommunicating between a private network user and a network with QoS guarantee, so that a user allocated private network address may intercommunicate with the network with QoS guarantee, and accordingly the end-to-end QoS guarantee may be realized.

Embodiments of the present invention provide a method for intercommunicating between a private network user and a network with QoS guarantee, including:

carrying identity information of the private network user in a service message transmitted from the private network user to a relevant function entity of the network with QoS guarantee;

translating, by a relevant function entity, the identity information of the private network user to a public address, and establishing a correspondence between the identity information and the public address;

establishing a connection with an opposite end using the public address, and implementing information interaction between the private network user and the opposite end of the network with QoS guarantee based on the connection.

Wherein, the identity information of the private network user is domain name and/or address and/or port information.

The relevant function entity is an Application Function entity or a Service Boundary Control Function entity.

According to the request message transmitted from the private network user, the Application Function entity or the Service Boundary Control Function entity applies a public address to an address translation gateway for the private network user, and the address translation gateway allocates a corresponding public address for the private network user, and returning it to the Application Function entity or the Service Boundary Control Function entity.

According to the request message transmitted from the private network user, the Application Function entity or the Service Boundary Control Function entity, initiates a request message for applying public address to a Policy Decision Function (PDF) or Bearer Control Function (BCF);

the PDF or the BCF applies a public address for the private network user to the address translation gateway, and the address translation gateway allocates the corresponding public address for the private network user and return it to the PDF or the BCF; and the PDF or the BCF further returns the public address to the Application Function entity or the Service Boundary Control Function entity for saving, or saves the public network address on the PDF or on the BCF.

The method also includes:

on the PDF or on the BCF, applying private network resource for the private network user with corresponding identity information of the private network user, and applying public network resource for the private network user with corresponding public address.

The Application Function entity or the Service Boundary Control Function entity carries the private address of the private network user in a message for applying public address, and initiates a request for applying public address to the address translation gateway directly or via the PDF or the BCF;

the address translation gateway allocates the public address for the private network user, and returns the correspondence information between the private address and public address to the Application Function entity or the Service Boundary Control Function entity; or, the Application Function or the Service Boundary Control Function carries the number of the public addresses which are needed in the message for applying the public address, and applies the public address to the address translation gateway directly or via the PDF or the BCF, and getting a group of public addresses returned by the address translation gateway; and the Application Function entity or the Service Boundary Control Function entity establishes a correspondence between the private address and the public address, and transfers the correspondence to the address translation gateway for media stream transmission when needed.

The method also includes: saving, by the Application Function entity or the Service Boundary Control Function entity, the correspondence between the private address of the private network user and the allocated public address, and establishing a connection with the opposite end using the public address information;

implementing information interaction between the private network user and the opposite end of the network with QoS guarantee based on the established connection.

The Application Function entity or the Service Boundary Control Function entity initiates a service request message to the PDF or the BCF with the private address of the private network user;

the PDF or the BCF determines the corresponding public address of the private network user according to the saved correspondence between the private address and the allocated public address, and establishes a connection with the opposite end using the public address information;

implements information interaction between the private network user and the opposite end of the network with QoS guarantee based on the established connection.

A system for intercommunicating between a private network user and a network with QoS guarantee, includes: a private network, a network with QoS guarantee and an address translation gateway, wherein the interaction information between the private network and the network with QoS guarantee is transmitted to the opposite end network after an address translation processing is implemented by the address translation gateway.

Wherein, the address translation gateway is arranged in a network entity of the network with QoS guarantee.

The private network user is connected with Application Function entity, the Service Boundary Control Function entity, or the PDF or the BCF element in the network directly or via the address translation gateway.

It could be seen from the technical solution provided in embodiments of the present invention, embodiments of the present invention implement an interactive allocation for QoS resource between the user having private address and the exterior network in the network with independent bearer control layer entity, so that the intercommunication between networks may be implemented conveniently, and the capability of the networks for adapting services is improved.

That is, according to embodiments of the present invention, the corresponding bearer control layer entity and application layer entity in the network with independent bearer control layer may obtain the correspondence relationship between the private address and the public address, and accordingly the corresponding public network resources may be allocated for the private network user.

DETAILED DESCRIPTION OF THE INVENTION

In the network with QoS guarantee, for example, in the network with independent bearer control layer, QoS signaling is interacted in various function entities, such as Application Function (AF), Policy Decision Function (PDF), Bearer Control Function (BCF) and Traffic Plane Function (TPF), to ensure the QoS of the services.

At present, the default address of all the service session media stream addresses transmitted in the signaling connection among the various function entities are public addresses, while the existence of private addresses is not considered.

The main idea of the present invention lies in that the bearer control layer entity and the application layer entity obtain the address (port) translation information in the network with independent bearer control layer, so that the network may implement correct resource allocation function. That is, the main object of the present invention lies in that the various function entities may process transmission and translation of the private addresses correctly and hence accomplish a correct addressing and resource allocation. Thus, the problems that the end-to-end QoS resource allocation cannot be solved and the end-to-end QoS cannot be guaranteed when the user uses a private address are solved.

An embodiment of the present invention provides a method for applying the function entity, such as the AF, the PDF, the BCF and the TPF, to implement corresponding processing when Network Address (Port) Translation (NA(P)T) is needed in the network with independent bearer control layer (which is referred as BCF network for simplicity).

Figure 1:
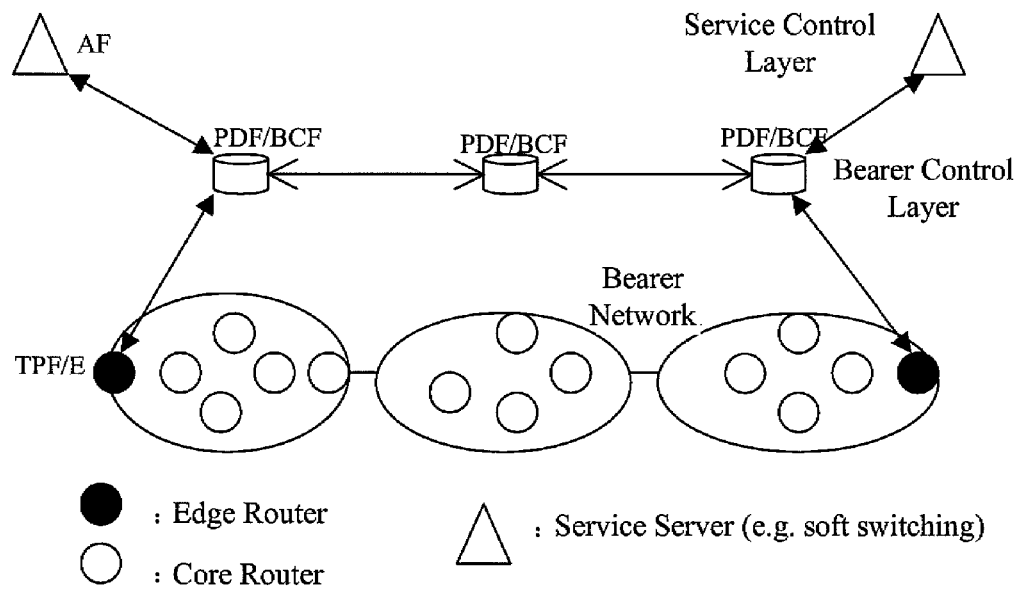
FIG. 1 is a schematic diagram of an architecture for a network in the prior art.

In FIG. 1, the PDF and the BCF may be in a same physical entity or in different physical entities (for example, the BCF is connected with the AF via the PDF), and they may exist in a certain segment of the network with only one logical state.

Several embodiments according to the method of present invention will be further described with reference to FIG. 2 and FIG. 3 for better understanding of the present invention.

In general, the signaling message initiated from the user to the AF includes the identity information of the calling and the called side. The signaling message may be a SIP INVITE (Session Initiation Protocol INVITE) message etc. The identity information of the calling and the called side may be a domain name, an address, port information and so on; and an AF, such as Service Boundary Control (SBC) Function, soft switching, P-CSCF etc., will resolute the address information in the signaling message. When corresponding address (e.g. the calling address) is a private address, the PDF or the BCF needs to implement corresponding address translation to ensure normal interaction of the information among the AFs.

An embodiment of the present invention provides two address translation methods in the case that the calling address is a private address, and hereinafter these two methods will be described respectively.

Figure 2:
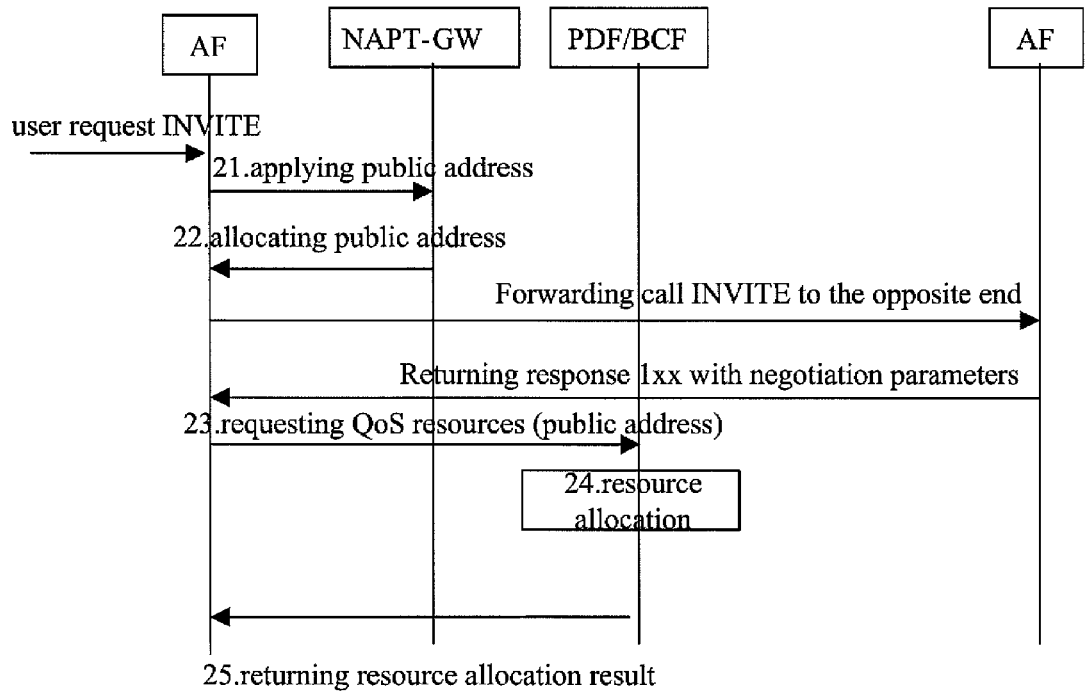
FIG. 2 is a schematic diagram illustrating the processing procedure 1 in the method according to an embodiment of the present invention.

Wherein, an implementation method is shown in FIG. 2, which specifically includes the steps of:

21: the AF transmits a request for applying public address to the NAPT gateway NAPT-GW;

22: upon receiving the request, the NAPT-GW allocates a corresponding public address for the AF and returns it to the AF;

in 21 and 22, the AF directly interacts the request with the gateway NAPT-GW with NA(P)T function (the TPF/ER or the Media Gateway shown in FIG. 1) while not via the PDF/BCF and appoints a correspondence between private address and public address for corresponding session media stream;

23: upon receiving the public address information, the AF initiates a QoS resource request to the PDF/BCF, and the media stream address to be carried is the allocated public address;

24: the PDF/BCF implements end-to-end signaling interaction and corresponding resource allocation directly using the corresponding public address, and the PDF/BCF does not need any additional operation because the public address is obtained;

25: the PDF/BCF returns the resource allocation result information to the AF.

As shown in FIG. 2, upon obtaining the public address allocated by the NAPT-GW, the AF may forward the INVITE message of the user to the opposite end AF based on the public address, and the opposite end will return a response message carrying negotiation parameters to the AF.

FIG. 2 only describes the address translation at the calling side, and the address translation at the called side located in the private network is similar to that of the calling side, and repeated explanations thereof will be omitted.

In FIG. 2, the process of NAPT-GW allocating the public address may be implemented with two approaches according to the demand:

(1) the correspondence between the private address and public address is determined in NAPT-GW and returned to the AF, and the AF may use the correspondence directly;

(2) if the number of the needed public addresses is carried in the message for applying public address transmitted by the AF, the NAPT-GW returns the public addresses with the corresponding number, while the AF determines the correspondence between the private address and the public address, and transmits the correspondence to the NAPT-GW for media stream transmission when needed.

Figure 3:
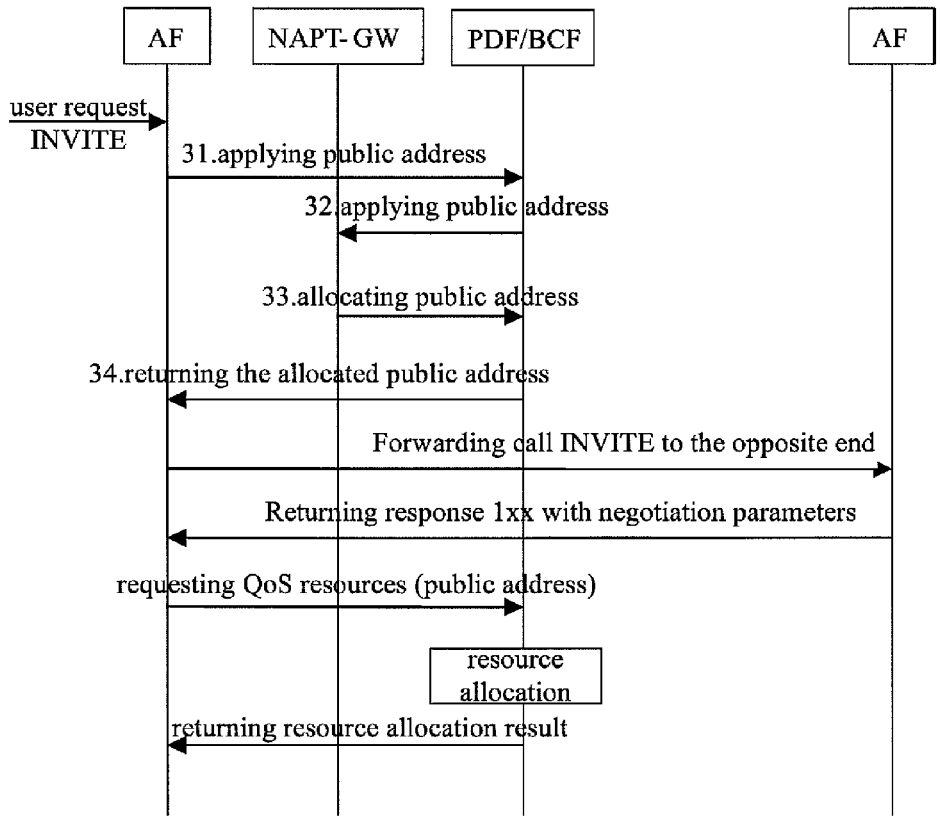
FIG. 3 is a schematic diagram illustrating the processing procedure 2 in the method according to an embodiment of the present invention.

Another process for address transformation is shown in FIG. 3, including:

31: the AF transmits a request for applying public address to the PDF/BCF;

32: upon receiving the request for applying public address, the PDF/BCF transmits a request for applying public address to the NAPT-GW;

33: upon receiving the request for applying public address, the NAPT-GW may allocate corresponding public address for the PDF/BCF, and return it to the PDF or the BCF;

34: the PDF/BCF returns the obtained public address to the AF again;

in 31 to 34, the AF interacts the request with NAPT-GW with NA(P)T function via the PDF/BCF and appoints a correspondence between the private address and the public address for corresponding session media stream;

the following processing is the same as that shown in FIG. 2, i.e. the AF initiates a QoS resource request to the PDF/BCF, and the media stream address to be carried is the allocated public address; moreover, when the PDF/BCF only interacts with the private network, the address transmitted from the AF through the QoS resource request message also may be a private address, and then the PDF/BCF determines the corresponding public address according to the private address, and implements end-to-end QoS signaling interaction directly using the public address so as to determine the resource allocation result, at the same time, the PDF/BCF also needs to return the resource allocation result to the AF; and whether to carry the public address in the QoS resource request message transmitted from the AF is determined by the AF according to the demand;

in FIG. 3, except for transferring the address correspondence between the AF and the NAPT-GW, the PDF or the BCF needs not to perform any other additional processing.

Also, FIG. 3 only describes the processing of the calling side, since the processing of the called side is similar to that of the calling side, and repeated explanations thereof will be omitted.

In FIG. 3, there are two approaches for determining the correspondence between the private address and the public address: one is determined by the NAPT-GW, the other is determined by the AF, and repeated explanations thereof will be omitted.

For the implementation method provided in FIG. 3, it should be noted that during the process for determining the address correspondence, the address correspondence should be transferred via the NAPT-GW connecting with the PDF/BCF and then obtained by the PDF/BCF, so that the address correspondence also may be saved on the PDF/BCF. When a private address is carried in the message transmitted from the AF, the corresponding public address is determined on the PDF/BCF and the corresponding processing is performed based on the public address.

In an embodiment of the present invention, a certain PDF/BCF in a network may interact with a certain device in a private network with a private address, or needs to dispatch some policy information, such as stream mapping, to a certain edge or relay or boundary device, or need to transfer correspondence between the private address and the public address to other PDF/BCF, and some of these functions need the public address and some of them need the private address, hence the correspondence between the private address and the public address needs to be recorded on the PDF/BCF. Various processing, such as interacting with the public network devices using the public address, and interacting with the private network devices using the private address and so on, may be implemented according to the correspondence between the private address and the public address.

During application of embodiments of the present invention, the calling side and the called side may simultaneously use any of the above-mentioned NA(P)T processing methods or use different processing method respectively, and which method should be used on the calling side and which method should be used on the called side is determined mainly according to the networking building mode and the demand of the operators.

Figure 4:
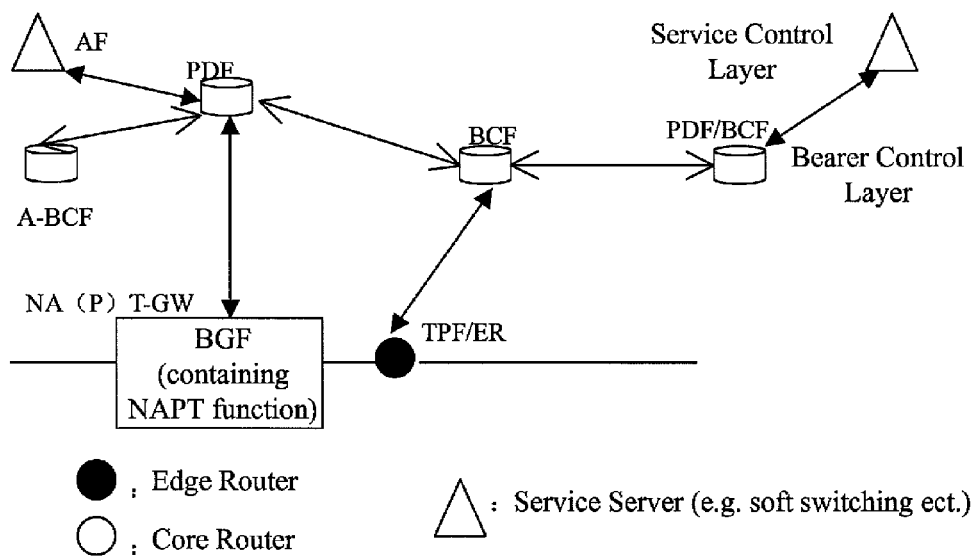
FIG. 4 is a schematic diagram illustrating the application networking in the method according to an embodiment of the present invention.

FIG. 4 provides a networking application of an embodiment of the present invention. As shown in FIG. 4, the PDF and the BCF are arranged in the network as separated physical entities, and the PDF may be combined with the AF as one physical entity. The NA(P)T-GW arranged independently or arranged in the BCF may divide the bearer network into a private network and a public network. The correspondence between the public address and the private address determined by the AF needs to be recorded on the PDF. When the PDF needs to apply private network resource (e.g. routing, bandwidth etc.) for the AF, the resource should be applied to the Bearer Control Function A-BCF in the private network with the private address of the AF. When the PDF needs to apply public network resource (e.g. routing, bandwidth etc.) for the AF, the resource should be applied to the BCF in the public network with the public address of the AF.

In summary, embodiments of the present invention implement the interactive allocation of QoS resources between the user with private address and the exterior network in the network with independent bearer control layer entity, thus the intercommunication among the networks may conveniently implemented and the capability of the networks for adapting services is improved.

While the present invention has been illustrated and described with reference to some preferred embodiments, the present invention is not limited to these. Those skilled in the art should recognize that various variations and modifications may be made without departing from the spirit and scope of the present invention as defined by the accompanying claims.

What is claimed is:

1. A method for intercommunicating between a private network user and a network with QoS guarantee, comprising:
    carrying identity information of the private network user in a request message transmitted from the private network user to a relevant function entity of the network with QoS guarantee;
    translating, by the relevant function entity, the identity information of the private network user to a public address, and establishing a correspondence between the identity information and the public address;
    establishing a connection with an opposite end using the public address, and implementing information interaction between the private network user and the opposite end of the network with QoS guarantee based on the connection;
    wherein, the relevant function entity is one of an Application Function entity and a Service Boundary Control Function entity;
    wherein, according to the request message transmitted from the private network user, the Application Function entity or the Service Boundary Control Function entity initiates a request message for applying public address to a Policy Decision Function or Bearer Control Function;
    the Policy Decision Function or the Bearer Control Function applies the public address for the private network user to an address translation gateway, and the address translation gateway allocates the corresponding public address for the private network user and returns the corresponding public address to the Policy Decision Function or the Bearer Control Function; and
    the Policy Decision Function or the Bearer Control Function returns the public address to the Application Function entity or the Service Boundary Control Function entity for saving, or saves the public network address on the Policy Decision Function or the Bearer Control Function.

2. The intercommunication method of claim 1, further comprising:
    on the Policy Decision Function or the Bearer Control Function, applying private network resource for the private network user with corresponding identity information of the private network user, and applying public network resource for the private network user with corresponding public address.

3. The intercommunication method of claim 1, wherein,
    the Application Function entity or the Service Boundary Control Function entity carries the private address of the private network user in a message for applying the public address, and initiates a request for applying the public address to the address translation gateway directly or via the Policy Decision Function or the Bearer Control Function;
    the address translation gateway allocates the public address for the private network user, and returns the correspondence information between the private address and public address to the Application Function entity or the Service Boundary Control Function entity; or,
    the Application Function or the Service Boundary Control Function carries the number of the public addresses which are needed in the message for applying the public address, and applies the public address to the address translation gateway directly or via the Policy Decision Function or the Bearer Control Function, and obtains a group of public addresses returned by the address translation gateway; and
    the Application Function entity or the Service Boundary Control Function entity establishes a correspondence between the private address and the public address, and transfers the correspondence to the address translation gateway for media stream transmission when needed.

4. The intercommunication method of claim 1, wherein,
the Application Function entity or the Service Boundary Control Function entity initiates a service request message to the Policy Decision Function or the Bearer Control Function with the private address of the private network user;
the Policy Decision Function or the Bearer Control Function determines the corresponding public address of the private network user according to the saved correspondence between the private address and the allocated public address, and establishes the connection with the opposite end using the public address information;
implements information interaction between the private network user and the opposite end of the network with QoS guarantee based on the established connection.

5. The intercommunication method of claim 1, further comprising: saving, by the Application Function entity or the Service Boundary Control Function entity, the correspondence between the private address of the private network user and the allocated public address, and establishing the connection with the opposite end using the public address information;
implementing information interaction between the private network user and the opposite end of the network with QoS guarantee based on the established connection.

6. A system for intercommunicating between a private network user and a network with QoS guarantee, comprising:
a private network, a network with QoS guarantee and an address translation gateway,
wherein, the interaction information between the private network and the network with QoS guarantee is transmitted to the opposite end network after an address translation processing is implemented by the address translation gateway;
wherein, the private network user is connected with an Application Function entity, a Service Boundary Control Function entity, or a Policy Decision Function or a Bearer Control Function in the network directly or via the address translation gateway; and
wherein, according to the request message transmitted from the private network user, the Application Function entity or the Service Boundary Control Function entity initiates a request message for applying public address to a Policy Decision Function or Bearer Control Function; the Policy Decision Function or the Bearer Control Function applies the public address for the private network user to the address translation gateway, and the address translation gateway allocates the corresponding public address for the private network user and returns the corresponding public address to the Policy Decision Function or the Bearer Control Function; and the Policy Decision Function or the Bearer Control Function returns the public address to the Application Function entity or the Service Boundary Control Function entity for saving, or saves the public network address on the Policy Decision Function or the Bearer Control Function.

7. The system for intercommunicating between the private network user and the network with QoS guarantee of claim 6, wherein, the address translation gateway is arranged in a network entity of the network with QoS guarantee.

* * * * *